US008407309B1

(12) United States Patent
Feldman et al.

(10) Patent No.: US 8,407,309 B1
(45) Date of Patent: Mar. 26, 2013

(54) TECHNIQUES FOR SPECIFYING AND DETERMINING PROPERTY INFORMATION FOR PORTAL ENTITIES USING ATTRIBUTES

(75) Inventors: Ofer Feldman, Hertzelia (IL); Yossi Pik, Tel Aviv (IL); Gaia Calabi, Tel Aviv (IL); Tsufit Naor, Kfar-Saba (IL); Ariel Bentolila, Ramat Hasharon (IL)

(73) Assignee: SAP AG, Walldorf (DE)

( * ) Notice: Subject to any disclaimer, the term of this patent is extended or adjusted under 35 U.S.C. 154(b) by 2728 days.

(21) Appl. No.: 11/021,409

(22) Filed: Dec. 22, 2004

(51) Int. Cl.
*G06F 15/16* (2006.01)
(52) U.S. Cl. ............... 709/217; 709/219; 707/999.01
(58) Field of Classification Search ............... 709/217, 709/219; 707/1, 10
See application file for complete search history.

(56) References Cited

U.S. PATENT DOCUMENTS

| | | | | |
|---|---|---|---|---|
| 6,327,628 B1 * | 12/2001 | Anuff et al. | ............... | 719/311 |
| 6,349,343 B1 | 2/2002 | Foody et al. | | |
| 6,718,535 B1 * | 4/2004 | Underwood | ............... | 717/101 |
| 6,721,747 B2 * | 4/2004 | Lipkin | ............... | 707/10 |
| 7,254,608 B2 * | 8/2007 | Yeager et al. | ............... | 709/203 |
| 7,346,843 B2 * | 3/2008 | Hind et al. | ............... | 715/234 |
| 7,406,510 B1 * | 7/2008 | Feldman | ............... | 709/217 |
| 2003/0105883 A1 | 6/2003 | Gibbons | | |
| 2003/0237044 A1 | 12/2003 | Hayer et al. | | |
| 2004/0002944 A1 | 1/2004 | Hauser et al. | | |
| 2004/0003097 A1 | 1/2004 | Willis et al. | | |
| 2004/0010598 A1 | 1/2004 | Bales et al. | | |
| 2004/0046789 A1 | 3/2004 | Inanoria | | |
| 2004/0049776 A1 | 3/2004 | Fomenko et al. | | |
| 2005/0021754 A1 * | 1/2005 | Alda et al. | ............... | 709/225 |
| 2005/0187908 A1 * | 8/2005 | Madan et al. | ............... | 707/3 |
| 2005/0188346 A1 * | 8/2005 | Hogg et al. | ............... | 717/101 |
| 2005/0262480 A1 | 11/2005 | Pik et al. | | |
| 2006/0041518 A1 * | 2/2006 | Blair et al. | ............... | 705/80 |
| 2006/0085336 A1 * | 4/2006 | Seubert et al. | ............... | 705/40 |
| 2006/0150148 A1 * | 7/2006 | Beckett et al. | ............... | 717/109 |

FOREIGN PATENT DOCUMENTS

| | | |
|---|---|---|
| WO | WO 2005/114388 A1 | 12/2005 |
| WO | WO 2005/114389 A1 | 12/2005 |

OTHER PUBLICATIONS

"ASP.NET, Demonstrating Attributes and Reflection in .NET," contributed by Wrox Team, pp. 1-22 downloaded from http://www.devarticles.com/index2.php?option=content&task=view&id=362 &pop=1&hi... on Nov. 17, 2004.
Cherng et al., "Contact First Web Services Interoperability between Microsoft .NET and IBM WebSphere," pp. 1-27 downloaded from http://msdn.microsoft.com/vstudio/java/interop/websphereinterop/default.aspx?print=true on Jan. 20, 2006.
Guest, S., "Web Services Interoperability Guidance (WSIG): IBM WebSphere Application Developer 5.1.2," pp. 1-16 downloaded from http://msdn.microsoft.com/vstudio/java/interop/strategies/default.aspx?pull=/library on Jan. 20, 2006.

(Continued)

*Primary Examiner* — Peling Shaw
(74) *Attorney, Agent, or Firm* — Buckley, Maschoff & Talwalkar LLC (57) ABSTRACT

Techniques are provided for automating determination of properties information for a portal entity. The properties information for a portal entity is determined from attributes specified for items upon which the portal entity is based. The properties information may be provided to a portal and used by the portal to execute the portal entity.

16 Claims, 7 Drawing Sheets

OTHER PUBLICATIONS

Guest, S., "Web Services Interoperability Guidance (WSIG): BEA WebLogic 8.1 SP3 (8.1.3)," pp. 1-10 downloaded from http://msdn.microsoft.com/vstudio/java/interop/strategies/default.aspx?pull=/library/en-us/.. on Jan. 20, 2006.

Herman, M., "Microsoft SharePoint Products and Technologies: Technical Overview," pp. 1-12 downloaded from http://www.microsoft.com/technet/prodtechnol/office/sps2003/plan/spst23to.mspx?pf=true on Nov. 23, 2004, updated Aug. 19, 2003.

"Implementing Rich Collaboration Infrastructure Using Microsoft Windows SharePoint Services and Microsoft Office SharePoint Portal Server 2003," White Paper (2003).

"Interoperability between Java and Microsoft, Understanding the problems and solutions when integrating heterogeneous distributed computing environments," Whitepaper by Intrinsyc Software, pp. 1-14 (2005).

Intrinsyc Software Product Brochures and other materials downloaded from http:www.intrinsyc.com on Jan. 20, 2006.

"Introducing Visual Studio," web pages downloaded from http://msdn2.microsoft.com/library(d=printer)/fx6bklf4.aspx on Jan. 20, 2006.

"Java/.NET Interoperability: A detailed Comparison of Options," A JNBridge White Paper, pp. 1-7 downloaded from http://www.jnbridge.com/cgi-bin/downloads.pl?itemID=4&view=2 on Oct. 18, 2005, paper date Apr. 5, 2004.

"JNBridgePro™: A Technical Overview," White Paper, pp. 1-6 (2002-2005).

Guest, S., "Web Services Interoperability Guidance (WSIG): IBM WebSphere Application Developer 5.1.2," pp. 1-6 downloaded from http://msdn.microsoft.com/vstudio/java/interop/strategies/default.aspx?pull=/library on Jan. 20, 2006.

"Introducing Visual Studio," web pages downloaded from http://msdn2.microsoft.com/library(d=printer)/fx6bk1f4.aspx on Jan. 20, 2006.

Preradovic, M., "Whitepaper: Microsoft .NET to J2EE Interoperability Performance Analysis," pp. 1-12 (2005).

"SAP Exchange Infrastructure: Process-centric collaboration," SAP White Paper, version 1.2, pp. 1-36 downloaded from http://www.isaca.be/Presentations/RT020928%0Exchange_White.pdf on Oct. 18, 2005, (2002).

"SAP Netweaver Platform Interoperability with IBM Websphere and Microsoft.NET," SAP White Paper, pp. 1-16 downloaded from http://www.sap.com/solutions/netweaver/pdf/BWP_Interoperability.pdf on Oct. 18, 2005, (2003).

"SAP® Enterprise Portal, Portal Infrastructure," pp. 1-16 (2003).

"SAP® Enterprise Portal—Portal Content," pp. 1-22 (2003).

"SharePoint Portal Server Deployment Resources," pp. 1-5 downloaded from http://office.microsoft.com/en-us/FX011442341033.aspx on Nov. 23, 2004.

"SharePoint Portal Server 2003 Product," pp. 1-2 downloaded from http://office.microsoft.com/office/sharepoint/prodinfo/default.mspx on Nov. 23, 2004.

"SharePoint Portal Server," pp. 1-2 downloaded from http://office.microsoft.com/en-us/FX010909721033.aspx on Nov. 23, 2004.

"Strategies for Interoperability," pp. 1-3 downloaded from http://msdn.microsoft.com/vstudio/java/interop/strategies/default.aspx on Jan. 20, 2006.

"Technical Note: JNBridgePro and Clustering," pp. 1-4 (2004).

Watts, M., "Solving the Enterprise Application Integration Challenge," brochure by Intrinsyc Software (2004).

* cited by examiner

FIG. 1

```
[PortalComponentClassProperty("GlobalWeatherTitle","Global Weather service description"
            ,UserPersonalization = PersonalizationType.NoDialog
            ,AdminPersonalization = PersonalizationType.Dialog
            ,PlainDescription = "PortalComponent Title"                                  }— 1
            ,LongDescription = "PortalComponent Title"
            ,PropertyType = PropertyValueType.String
            ,Category = "GlobalWeather")]
[PortalComponent("WeatherPortalComponent","WeatherPortalComponent.aspx")]  }— 2
public class WeatherPortalComponent : SAP.Portal.Web.UI.PortalComponent
{
        /// <summary>
        /// The MaxToDisplay is a numeric value that includes the maximum number of stations to
        /// display at the station list.
        /// It is editable both by administrator, and end user.
        /// This property will be displayed at the property editor under the Global weather category,
        /// with a 'Maximum stations to disaply' label, and a tooltip.
        /// </summary>
        [PortalComponentFieldProperty(
                    UserPersonalization = PersonalizationType.Dialog,
                    AdminPersonalization = PersonalizationType.Dialog,
                    PropertyType = PropertyValueType.Integer,                           }— 3
                    PlainDescription = "Maximum stations to display",
                    LongDescription = "The Maximum number of stations in the station list",
                    Category = "GlobalWeather")]
   4 { [DefaultValue(20)]
        public int MaxToDisplay
        {
                    get { return int.Parse(this.Profile["MaxToDisaply"]); }
        }

/// <summary>
        /// The SelectStationCodeType enable to personalize the type of code to display at the airport
        /// station list.
        /// The station code will be selected from a list of the possible code types, at the property
        /// editor.
        /// It is editable only by administrator.
        /// This property will be displayed at the property editor under the Global weather category.
        /// </summary>
        [PortalComponentFieldProperty(PropertyType = PropertyValueType.String,
                    UserPersonalization = PersonalizationType.NoDialog,
                    AdminPersonalization = PersonalizationType.Dialog,                  }— 5
                    ValidValues="4/icao3/wmo4/iata",
                    Category = "GlobalWeather")]
        [DefaultValue("iata")]
        public string SelectStationCodeType
        {
                    get { return this.Profile["SelectStationCodeType"]; }
        }
}
```

```xml
<?xml version="1.0" encoding="utf-8"?>
<application>
    <application-config>
        <property name="SharingReference" value="com.sap.portal.dotnet.framework" />
    </application-config>
    <services/>
    <components>
        <component name="WeatherPortalComponent">   ◄─── A
            <component-config>
                <property name="ClassName" value="com.sap.portal.dotnet.framework.iViewProcessorComponent" />
                    <property name="SecurityZone" value="com.sap.portal/no_safety" />
            </component-config>
            <component-profile>
                <property name="ComponentType" value="com.sapportals.portal.iview" />
                <property name="com.sap.portal.dotnet.iViewName" value="WeatherPortalComponent.aspx">
                    <property name="personalization" value="NONE" />
                    <property name="administration" value="DIALOG-READ-ONLY" />
                    <property name="category" value=".NET info" />
                </property>
                <property name="com.sap.portal.dotnet.customProperties" value="GlobalWeatherTitle; ... ">
                    <property name="personalization" value="NONE" />
                    <property name="administration" value="DIALOG-READ-ONLY" />
                    <property name="category" value=".NET info" />
                </property>
                <property name="GlobalWeatherTitle" value="Global Weather service description">
                    <property name="personalization" value="NO_DIALOG" />
                    <property name="administration" value="DIALOG" />
                    <property name="longDescription" value="PortalComponent Title" />
                    <property name="plainDescription" value="PortalComponent Title" />
                    <property name="category" value="GlobalWeather" />
                    <property name="type" value="String" />
                </property>
                <property name="MaxToDisplay" value="20">
                    <property name="personalization" value="DIALOG" />
                    <property name="administration" value="DIALOG" />
                    <property name="plainDescription" value="Maximum stations to display" />
                    <property name="longDescription" value="The Maximum number of stations in the station list" />
                    <property name="category" value="GlobalWeather" />
                    <property name="type" value="Integer" />
                </property>
                <property name="SelectStationCodeType" value="iata">
                    <property name="personalization" value="NO_DIALOG" />
                    <property name="administration" value="DIALOG" />
                    <property name="validvalues" value="4/icao3/wmo4/iata" />
                    <property name="category" value="GlobalWeather" />
                    <property name="type" value="String" />
                </property>
            </component-profile>
        </component>
    </components>
</application>
```

(B bracket groups the GlobalWeatherTitle, MaxToDisplay, and SelectStationCodeType property blocks.)

TECHNIQUES FOR SPECIFYING AND DETERMINING PROPERTY INFORMATION FOR PORTAL ENTITIES USING ATTRIBUTES

BACKGROUND OF THE INVENTION

The present invention relates to the field of portals, and more particularly to techniques for using attributes to describe portal entities.

Portals such as enterprise portals provide a central gateway through which users can access different types of information and services such as enterprise information, applications including portal and other applications, databases, data warehouses, desktop documents, web content and services, and the like. A portal thus unifies independent information systems into a single, seamless user experience. For an enterprise, a portal acts as a single point of access for heterogeneous business applications and collaboration, providing the information and tools needed by a user within the enterprise.

The success of any portal depends on the applications and content supported by the portal. Accordingly, an ever increasing number of applications are being developed for portals by developers. Several portal vendors also provide Portal Development Kits (PDKs) to facilitate and simplify the task of developing portal applications and deploying the applications to the target portals. For example, developers may create code files and other files that implement a portal application using a PDK and then deploy the files to the portal where the portal application is to be executed.

A portal application may comprise one or more portal entities. A portal entity may be a user interface component, a portal snippet, a service, and the like. Portal snippets are portal entities that are configured to display information in various formats, such as text, figures, graphs, reports, tables, charts, etc., to a portal user. Portal snippets are used to organize content on portals pages and support the integration of information and functions from a wide range of sources. For example, a portal snippet may be programmed to extract financial information (e.g., stocks information) from various financial repositories and display the information to the user. A portal page may comprise one or more portal snippets. Examples of portal snippets include portlets, iViews from SAP, gadgets from Plumtree, web parts from Microsoft Corporation, and others.

The portal entities may be based upon one or more items that may be developed by developers or may be created from other sources. Examples of items include code files (e.g., *.aspx files, *.ascx files), text files, images, dynamic link libraries (dlls), executables, JARs (Java compiled code), resources, and the like.

When a portal application is to be deployed to a target portal, information declaring the various portal entities is created and provided to the portal. This information may be referred to as "portal entity definition information". The portal entity definition information may comprise various types of information related to one or more portal entities. For example, the portal entity definition information may comprise information identifying the name of a portal entity, class information for a portal entity, information identifying a portal entity type, dependency information, security settings information, properties information (e.g., profile or personalization settings information), code links, etc. The portal entity definition information is made available to the target portal and used by the target portal to execute (e.g., display, render, etc.) the portal entity. In some implementations, an archive (e.g., a compressed package) is generated comprising the items for a portal application and the portal entity definition information describing the various portal entities. The archive is then deployed to the target portal.

Conventionally, the portal entity definition information is manually configured. This task can be quite time consuming and tedious task as the developer has to define the portal entities and then determine information for each portal entity. This is especially cumbersome for determining properties information for the portal entities. The developer generating the portal entity definition information also has to remember the exact format and syntax to be used for creating the portal entity definition information. As a result, the task of manually generating portal entity definition information is tedious and time consuming. This in turn makes the creation and deployment of portal applications and portal entities a complicated and time consuming process.

BRIEF SUMMARY OF THE INVENTION

Embodiments of the present invention provide techniques for automating the process of determining properties information for a portal entity. The properties information for a portal entity is determined from attributes specified for items upon which the portal entity is based. The properties information may be provided to a portal and used by the portal to execute the portal entity.

According to an embodiment of the present invention, techniques are provided for determining property information for a portal entity. A set of one or more items on which the portal entity is based is determined. A set of attributes specified for the set of one or more items is determined. Property information for the portal entity is determined from the set of attributes.

According to an embodiment of the present invention, the property information is provided to a portal used by the portal for execution of the portal entity.

According to another embodiment of the present invention, techniques are provided for deploying items to a portal. Information is received identifying a plurality of items to be deployed to a portal. A set of one or more portal entities is determined. Property information is determined for each portal entity in the set of portal entities based upon attributes specified for one or more items from the plurality of items. An archive is created comprising the plurality of items and the property information determined for each portal entity in the set of portal entities. The archive is deployed to the portal, wherein the property information for a portal entity is used by the portal during execution of the portal entity.

The foregoing, together with other features, embodiments, and advantages of the present invention, will become more apparent when referring to the following specification, claims, and accompanying drawings

BRIEF DESCRIPTION OF THE DRAWINGS

FIG. 2 depicts an example of an item having attributes specifying property information for a portal entity according to an embodiment of the present invention;

FIG. 6 depicts a XML file comprising property information that is automatically generated according to an embodiment of the present invention;

DETAILED DESCRIPTION OF THE INVENTION

In the following description, for the purposes of explanation, specific details are set forth in order to provide a thorough understanding of the invention. However, it will be apparent that the invention may be practiced without these specific details.

Figure 1:
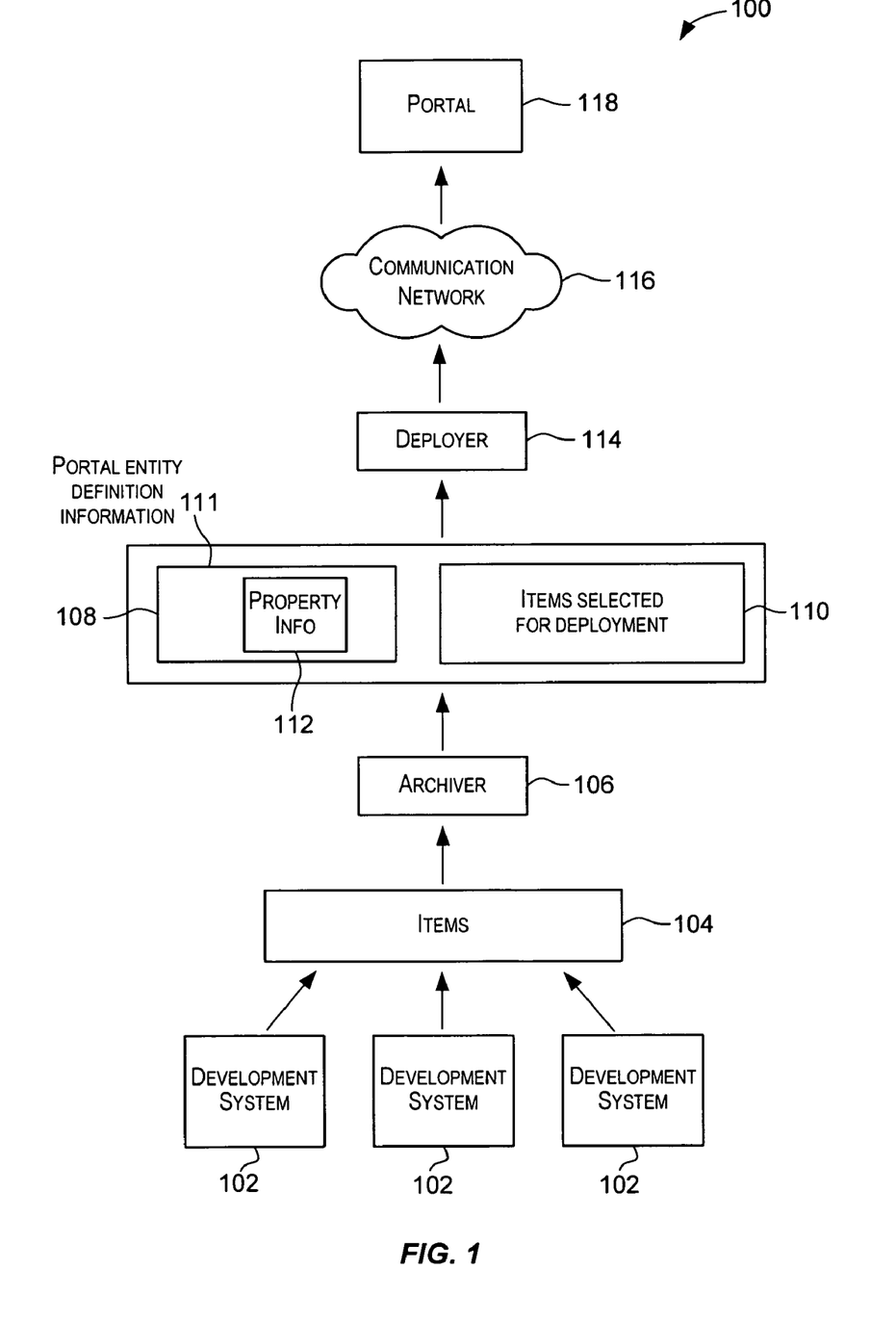
FIG. 1 is a simplified block diagram of a system that may incorporate an embodiment of the present invention.

FIG. 1 is a simplified block diagram of a system 100 that may incorporate an embodiment of the present invention. FIG. 1 is merely illustrative of an embodiment incorporating the present invention and does not limit the scope of the invention as recited in the claims. One of ordinary skill in the art would recognize other variations, modifications, and alternatives.

As depicted in FIG. 1, developers may use development systems 102 to develop portal applications comprising one or more portal entities. A portal entity may be a user interface component displayed by a portal, a portal snippet (e.g., a SAP iView), a service, or any other component executed by a portal. Developers may use systems 102 to generate items 104 which form the basis of portal applications and portal entities. Items 104 may include code files (e.g., class files, *.ascx files, *.aspx files), text files, various resources used by an application (e.g., images, style sheets, cascading style sheets, language strings files, etc.), executables, dynamic link libraries (dlls), and the like. Items 104 may include compiled items that are generated by a compilation process. For example, a non-compiled item such as a code file may be compiled to generate a compiled item (e.g., a dll, compiled objects).

Several programming environment provide mechanisms that enable a developer to specify metadata (or descriptive information) for items (e.g., code files) developed by the developer. Attributes provide one such mechanism. The metadata information specified by an attribute is stored as part of the item for which the attribute is specified. For example, .NET provides attribute that enables developers to add metadata that describes or annotates specific elements of code such as classes, methods, properties, etc. According to the teachings of the present invention, a developer may use attributes (including .NET attributes) to specify property information for a portal entity. A developer may associate or add attributes to items on which a portal entity is based upon, the attributes specifying property information for the portal entity. For example, for a code file corresponding to a portal entity (i.e., on which a portal entity is based), a developer may add attributes to the particular code file specifying one or more properties for the portal entity and information related to the properties Accordingly, a developer using a .NET PDK may use the attributes mechanism provided by .NET to specify attributes for a portal entity by adding the attributes to one or more items on which the portal entity is based.

The property information specified by for a portal entity is used by a portal during execution of the portal entity. Execution may include displaying a user interface component, running a portal snippet, executing a portal service, and the like. The property information for a portal entity may be used to control the runtime behavior of the portal entity. Accordingly, according to an embodiment of the present invention, attributes may be used to specify metadata for a portal entity that describes the portal entity and also controls the functionality of the portal entity.

The property information that is specified for a portal entity using attributes may define one or more properties for the portal entity. For a property, the property information may specify a name of the property and values, if any, assigned to the property. Additional information may also be provided for a property. In one embodiment, the additional information for a property is provided via sub-properties of the property. A property may have one or more sub-properties and values may be assigned to the sub-properties. Examples of sub-properties for a property include the default value of the property, valid values for the property value, who (e.g., administrator, user) can configure the property, and other like sub-properties. Accordingly, property information for a portal entity may comprise information identifying one or more properties, values associated with the properties, and additional information related to the properties, the additional information including one or more sub-properties of a property and values assigned to the sub-properties.

The property information for a portal entity may be used to personalize settings the portal entity. For example, values may be assigned to properties to customize or personalize the execution behavior of the portal entity. The personalized information may be used by a portal at runtime to control the behavior of the portal entity. For example, personalization properties may be specified for a portal snippet. The personalization properties may be used to determine the page layout (e.g., the number of rows to show in a table) of a portal snippet, the look-and-feel of the portal snippet, and the like.

Accordingly, embodiments of the present invention enable developers to specify personalization properties (and sub-properties) for a portal entity. Values may also be set for the properties and their sub-properties. The values for properties and sub-properties may also be set in the portal itself, using end-user personalization screens or administrative screens. For example, a sub-property may be specified for a property to control the universe of users who are permitted or allowed to configure or set values for the property (i.e., entities that are allowed to personalize a property). According to one embodiment, only the portal administrator may be permitted to set value for a property, or only a portal end user may be permitted to specify values for a property, or alternatively both a portal administrator and a portal end user may be permitted to specify values for a property. Various other types of properties and sub-properties are also possible.

In a specific embodiment (e.g., in a specific version of .NET), attributes may be specified for an item using the following syntax notation:

[AttributeName([Parameters])]

where AttributeName is the name of the attribute, and Parameters is a listing of parameters required by the Attribute's constructor. "Parameters" may be used to specify a name of a property, a value to be assigned to the property, one or more sub-properties of the property and values for the sub-properties. .NET provides several standard attributes. Developers may also write custom attributes. In one embodiment, custom attributes are developed by sub-classing from the System.Attribute class provided by .NET.

Using the syntax shown above, a developer may add an attribute to an item (e.g., a code file) to specify property information for a portal entity that is based upon the item. A portal entity may be based upon one or more items. One or more attributes defined for the one or more items may be used to specify property information for the portal entity. In this manner, attributes enable a developer to provide property information for a portal entity while developing items (e.g., code) for the portal entity and store the information as part of the items. Since a portal entity may be used in different applications, in different places, and for different users, the property information specified for a portal entity may vary depending on the type and use of the portal entity.

An example of an item with attributes specified for the item specifying property information for a portal entity is depicted in FIG. 2 and described below in further detail. When an item for which attributes have been specified is compiled to produce a compiled item, the attributes, if any, specified for the item are stored as metadata of the compiled item.

Referring back to FIG. 1, a set of one or more items from items 104 may then be selected for deployment to a target portal. For example, items for a portal application and all portal entities that are part of the portal application may be selected for deployment. Alternatively, items for a portal entity may be selected for deployment. The selected items may include compiled items and other non-compiled items (e.g., code files, resources, etc.). According to an embodiment of the present invention, as part of the deployment process, an archive is created using the selected set of items. In some embodiments, the archive is referred to as a portal archive or PAR.

In the embodiment depicted in FIG. 1, an archiver system 106 is configured to select a set of items 110 from items 104 for deployment and to prepare an archive 108 to be deployed to a target portal 118. Information identifying the items to be deployed may be provided to archiver 106. Alternatively, archiver 106 may receive information identifying a project or application that is to be deployed. Based upon this information, archiver 106 may be configured to determine a set of items to be included in the archive for deployment. In some embodiments, archiver 106 may also be configured to compile one or more of the selected items to generate compiled items that are then included in archive 108. Items 110 included in an archive may thus comprise non-compiled items (e.g., *.ascx files, *.aspx files, images, header files, other code files, resource information, etc.) and/or compiled items (e.g. dlls, executables, etc.).

According to an embodiment of the present invention, archiver 106 is also configured to determine portal entity definition information 111 for the selected items. The portal entity definition information 111 describes portal entities and may be used by the portal during runtime for executing a portal application or for controlling the execution behavior of a portal entity. Portal entity definition information 111 may comprise various types of information including names of portal entities, class information for portal entities, dependency information for portal entities, security settings, properties information 112, code links, etc. According to an embodiment of the present invention, as part of determining portal entity definition information 111, archiver 106 is configured to automatically determine property information 112 for portal entities based upon selected items 110. Archiver 106 is configured to determine property information for the portal entities from the attributes specified for one or more of the items selected for deployment. For non-compiled items or text items, archiver 106 may determine the attributes and the properties information using text parsing techniques. Different techniques may be used to determine attributes from compiled items. As previously stated, when a non-compiled item (e.g., a code file) is compiled to produce a compiled item (e.g., a dll), the attributes, if any, specified for the non-compiled items are stored as metadata of the compiled item. In the .NET environment, archiver 106 may use .NET reflection to determine the attributes metadata and accordingly the property information specified by the attributes for a compiled item.

In this manner, archiver 106 is configured to automatically determine property information 112 for portal entities based upon the items included in an archive. Unlike conventional technique, the property information does not have to be manually determined. Property information 112 determined by archiver 106 for one or more portal entities based upon items 110 may then be included in portal entity definition information 111 for the items to be deployed. According to an embodiment of the present invention, for each portal entity, archiver 106 creates an entry in portal entity definition information 111 for storing property information determined for the portal entity from attributes specified for items 110. In this manner, the property information for portal entities is automatically determined and added to the portal entity definition information.

Portal entity definition information 111 may be embodied in various forms. In one embodiment, portal entity definition information 111 is stored in a file ("portal entity definition file") and archiver 106 is configured to create an entry in the portal entity definition file for each portal entity based upon the items to be deployed. In one embodiment, the portal entity definition file is stored in XML format. Various other formats may be used in alternative embodiments.

As described above, according to an embodiment of the present invention, the property information portion of portal entity definition information is automatically generated based upon attributes defined for items corresponding to the portal entity. Other portions of portal entity definition information 111 may also be automatically generated by archiver 106 in other embodiments. Alternatively, other portions of portal entity definition information 111 may be manually generated. An example of a XML archive description file generated according to an embodiment of the present invention is depicted in FIG. 6 and described below in further details.

After an archive 108 has been created, the archive is then deployed to a target portal (e.g., a SAP enterprise portal) 118 by deployer 114. In the embodiment depicted in FIG. 1, archive 108 may be deployed to portal 118 via a communication network 116. Communication network 116 may be a local area network (LAN), a wide area network (WAN), a wireless network, an Intranet, the Internet, a private network, a public network, a switched network, or any other suitable communication network. Communication network 116 may comprise many interconnected computer systems and communication links. The communication links may be hardwire links, optical links, satellite or other wireless communications links, wave propagation links, or any other mechanisms for communication of information. Various communication protocols may be used to facilitate communication of information via the communication links, including TCP/IP, HTTP protocols, extensible markup language (XML), protocols under development by industry standard organizations, vendor-specific protocols, customized protocols, and others. In one embodiment, as a result of the deployment, the deployed items and the portal entity definition information may be stored in a portal repository of portal 118.

Once deployed, the portal application and portal entities may be executed by portal 118. The information stored in portal entity definition information 112 including properties information 112 may be used by the portal to determine and/or control the runtime behavior of the portal entities. For example, portal 118 may use portal entity definition information 112 or portions thereof to control the manner in which a portal snippet is displayed, the manner in which personalization properties are configured, the manner in which information is displayed, and other behavioral aspects of a portal entity.

It should be apparent that the system depicted in FIG. 1 is not intended to limit the scope of the present invention as recited in the claims. For example, although deployer 114 and archiver 106 are shown as two separate systems in FIG. 1, the functions performed by these systems may be performed by a single system or multiple systems. The functions may be performed by software modules (code or instructions), or hardware modules, or combinations thereof.

Embodiments of the present invention provide techniques for automatically determining property information for portal entities based upon attributes specified for items on which the portal entities are based. The property information that is determined may then be automatically included in the portal entity definition information. In FIG. 1 and as described above, the property information and the portal entity definition information is automatically generated as part of the deployment process. However, deployment is not necessary for embodiments of the present invention. The property information for portal entities may also be automatically generated for various other processes and in the context of other applications. For example, a user may simply request generation of portal entity definition information without deployment. A user may also simply want to generate property information for a set of portal entities and in response, the property information is automatically generated according to the teachings of the present invention.

FIG. 2 depicts an example of an item having attributes specifying property information for a portal entity according to an embodiment of the present invention. The item depicted in FIG. 2 and the attributes depicted in FIG. 2 are not in any way intended to limit the scope of the present invention. It should be apparent that attributes may be specified for other types of items and various other types of attributes are possible. As depicted in FIG. 2, five attributes have been specified and labeled 1 through 5. The attributes in FIG. 2 are used to specify property information for a portal entity that is a user interface component.

Attribute #1 is an attribute adding a portal entity property, used without an actual class property. Attribute #1 may be inserted in the code above class definitions to add portal entity properties. The attribute may be specified as many times as desired by the developer, each specification instance adding a property. As depicted in FIG. 2, attribute #1 specifies a property called "GlobalWeatherTitle" that is specified for the portal entity (i.e., for the user interface component). This name provides an access point available through the Profile API. The default value of the property is set to "Global weather service description". Several sub-properties and their corresponding values have also been defined for the property (using the "Sub-Property=Value" format) including a sub-property specifying the property type as String. The developer has specified that only an administrator is permitted to personalize (i.e., set values for) this property. The developer has chosen to put this property under the category "GlobalWeather". This implies that in the portal personalization screens that may be presented for personalizing the property, this property will be found under a special category called "GlobalWeather" (see FIG. 3). Also, description information has been specified for the property. This information may be shown in the portal personalization screens (e.g., as a label or a tool tip).

Attribute #2 is an attribute that specifies a title for a portal entity. In FIG. 2, the title "WeatherPortalComponent" is specified for a user interface component portal entity defined in the WeatherPortalComponent.aspx file. A user can change this as desired. During runtime, the portal uses the specified title for the user interface component.

Attribute #3 is an attribute adding a portal entity property, used with an actual class property. This attribute is added above class properties to mark them as portal entity properties. The name for the property need not be specified as it will default to that of the class property ("MaxToDisplay"). As depicted in FIG. 2, the developer has marked this property as personalizable by both the end user and administrator. Various sub-properties and their corresponding values have been specified. The type of the value for this property is Integer. The class property defines a "get" that will return the actual value from the profile.

Attribute #4 is a standard .NET attribute used to mark a default value that will be given to a property (to MaxToDisplay). Several attributes may be specified over a property to set values and additional information for the property. A default value (as also in attributes 1, 2, 3, and 5) is the value to which the property is set if not specified or personalized by the end user or by an administrator.

Attribute #5 is an attribute adding a portal entity property, used with an actual class property. The name for the property is not specified and defaults to "SelectionStationCodeType" that follows the attribute definition. The attribute in this example is like attribute #3 with a different type (string) and is set to be personalizable only by an administrator. In FIG. 2, a list of valid values for the property has been specified. In a user interface (e.g., personalization screens) for setting a value for the property, the list of valid values may be displayed as a combo box from which the user can select a value (see FIG. 3).

As shown above, multiple attributes may be used to specify property information for a portal entity. The property information may include information identifying properties, values for properties, and additional information related to the properties (which may be specified in the form of sub-properties and their associated values). In the code depicted in FIG. 2, attributes PortalComponentClass and PortalComponentField are custom attributes. The PortalComponentClass attribute can be used to set attributes for a class. The PortalComponentField attribute can be used to set attributes for fields. Standard attributes such as those provided by .NET may also be added for an item to specify property information for one or more portal entities based upon that item.

Attributes specified for an item may be easily seen or reviewed by a user. .NET Visual Studio's provides an Intellisense feature for inserting attributes into items (e.g. to add attributes to code files) and also enables the user to see the attributes specified for an item. This provides on-the-fly access to the attributes information and the properties information defined using the attributes.

Figure 3:
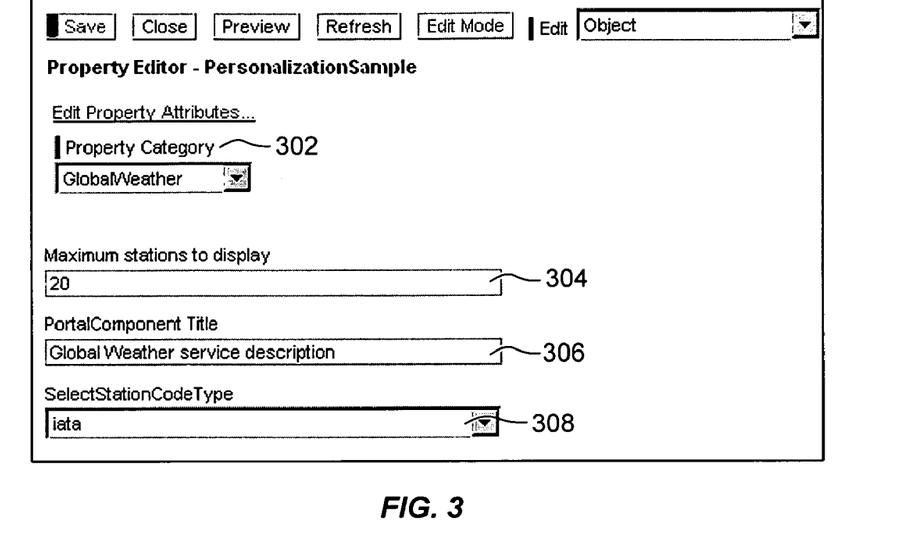
FIG. 3 depicts a user interface component displayed by a portal based upon attributes specified in FIG. 2 according to an embodiment of the present invention.

The property information specified for a portal entity (such as a user interface component) via attributes depicted in FIG. 2 may be provided to a portal and used by the portal to execute the portal entity. FIG. 3 depicts a user interface component 300 displayed by a portal based upon attributes specified in FIG. 2 according to an embodiment of the present invention. User interface component (or portal entity) 300 enables an administrator to personalize properties for the portal entity. As depicted in FIG. 3, a combo box 302 is displayed showing the special category specified for the property. Value 304 for the maximum stations to display defaults to 20 as specified by the property information. A title 306 specified for the portal entity is displayed. A combo box 308 is displayed for predefined valid values from which the administrator may choose a value.

Figure 4:
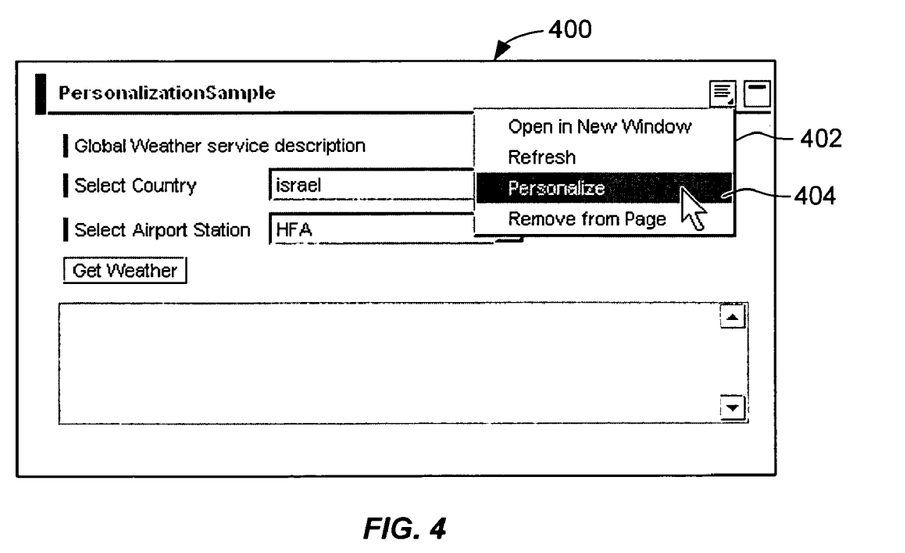
FIG. 4 depicts a user interface that enables a user to personalize properties according to an embodiment of the present invention.
Figure 5:
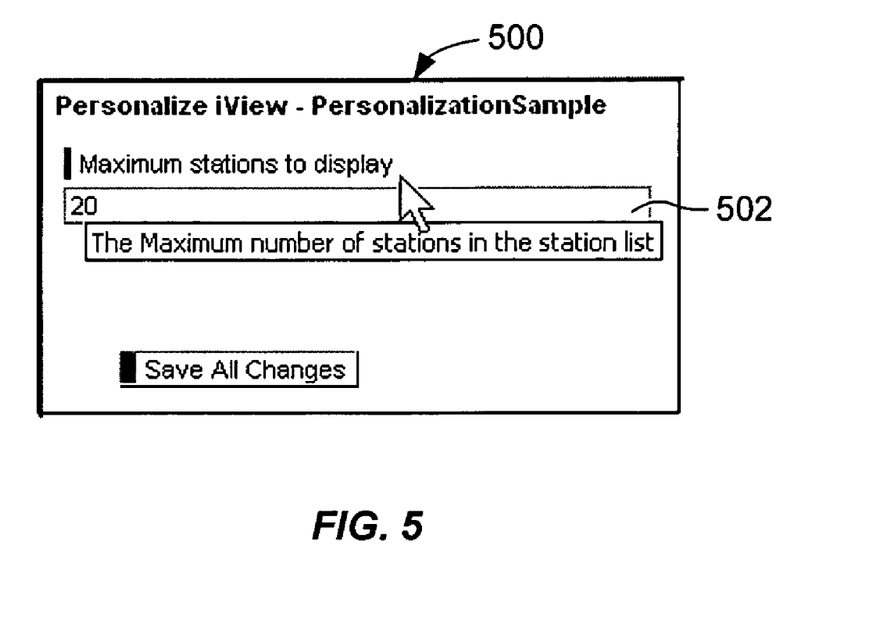
FIG. 5 depicts a user interface component displayed by a portal based upon the attributes specified for the item in FIG. 2 according to an embodiment of the present invention.

FIG. 4 depicts a user interface 400 that enables a user to personalize properties according to an embodiment of the present invention. The user may select a "personalize" option 404 from a menu 402. According to an embodiment of the present invention, interface component 500 depicted in FIG. 5 is displayed upon selection of option 404. FIG. 5 depicts a user interface component 500 displayed by a portal based upon the attributes specified for the item in FIG. 2. User interface component 500 allows a portal end user to personalize a portal snippet according to an embodiment of the present invention. Per the property information specified in FIG. 2, only one property is defined as being user definable (or personalizable), and accordingly only that one property is displayed to the user in FIG. 5 for personalization. The default value for the property is set to 20.

As indicated above, in one embodiment, the portal entity definition information may be stored as an XML file. The XML file may comprise property information for one or more portal entities where the property information is automatically determined from attributes defined for items on which the portal entities are based. FIG. 6 depicts a XML file comprising property information that is automatically generated according to an embodiment of the present invention. As depicted in FIG. 6, reference "A" identifies the portal entity and marks the beginning of property information for the portal entity. The portal entity identified in FIG. 6 is a user interface component named "WeatherPortalComponent". Section B corresponds to property information that is automatically determined for portal entity "WeatherPortalComponent" from the attributes defined for the item (code file) depicted in FIG. 2. As shown, section B identifies three properties "GlobalWeatherTitle", "MaxToDisplay" and "SelectionStationCodeType", values for the properties, a list of sub-properties for the each property and their corresponding values. In addition to section B, other sections of the XML file depicted in FIG. 6 may also be automatically generated by embodiments of the present invention.

Figure 7:
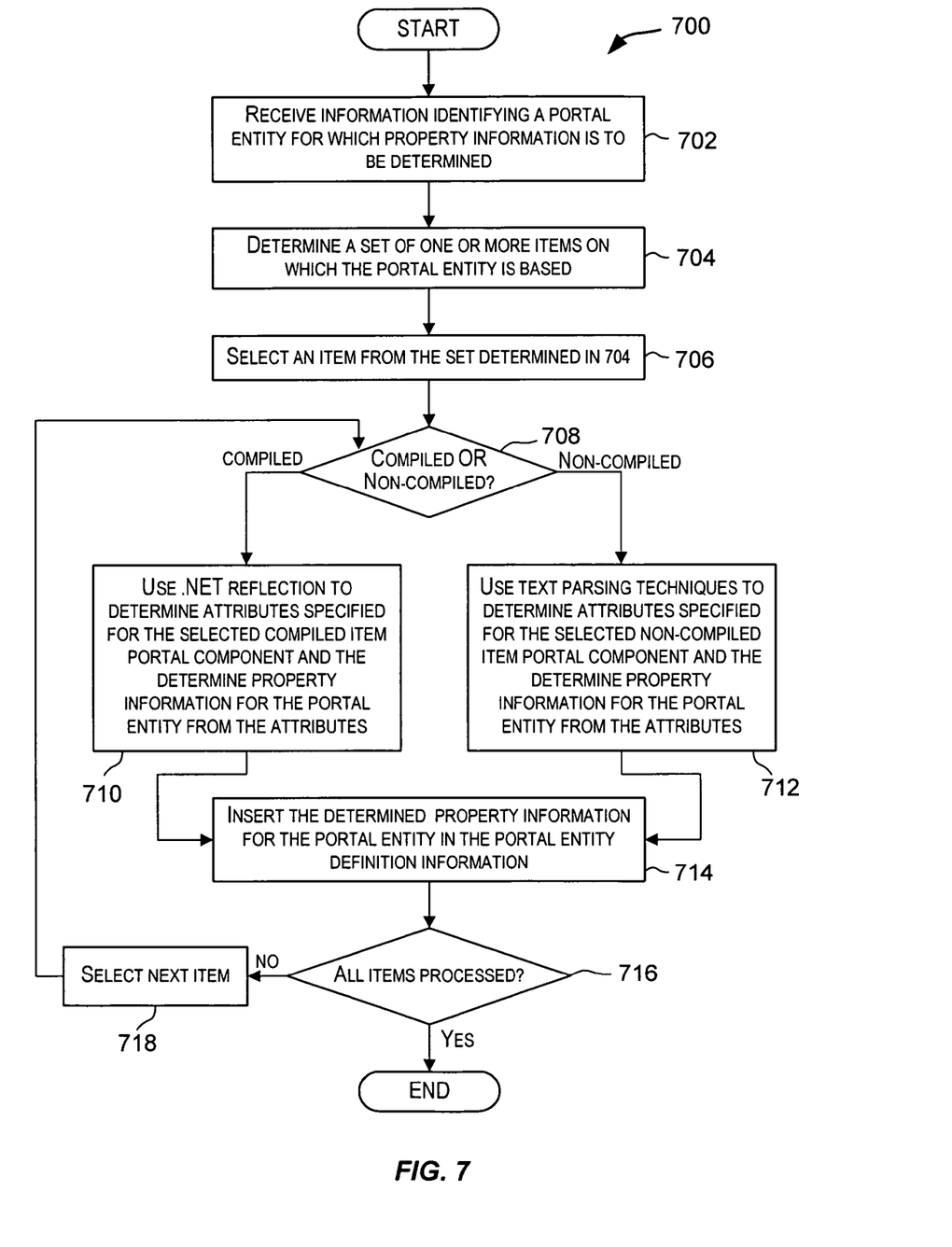
FIG. 7 is a simplified high-level flowchart depicting a method of automatically determining property information for a portal entity according to an embodiment of the present invention.

FIG. 7 is a simplified high-level flowchart 700 depicting a method of automatically determining property information for a portal entity according to an embodiment of the present invention. The method depicted in FIG. 7 may be performed by software code modules or instructions executed by a processor, hardware modules, or combinations thereof. Flowchart 700 depicted in FIG. 7 is merely illustrative of an embodiment of the present invention and is not intended to limit the scope of the present invention. Other variations, modifications, and alternatives are also within the scope of the present invention. The method depicted in FIG. 7 may be adapted to work with different implementation constraints.

Processing is initiated upon receiving information identifying a portal entity for which property information is to be determined (step 702). There are various ways in which the information received in 702 may be provided. In one embodiment, a configuration file may identify a list of portal entities for which information is to be determined. For example, during a deployment, a configuration file may identify a set of items to be deployed and the portal entities corresponding to the items. In other embodiments, a file (e.g., *.ascx file) may be used to define each portal entity. The name of the file may correspond to the name of a portal entity. For example, information may be received identifying a project (e.g., a portal application) and the *.ascx files for the project may identify the various portal entities for the project. Accordingly, a file (or set of files) may be provided or determined corresponding to portal entities for which property information is to be determined.

A set of one or more items upon which the portal entity identified in 702 is based is then determined (step 704). In one embodiment, the information identifying the portal entity received in 702 may also identify a set of items on which the portal entity is based. For example, the *.ascx file may identify items corresponding to a portal entity.

An item from the set determined in 704 is then selected for processing (step 706). A determination is made whether the selected item is a compiled item (e.g., a dll, an executable, etc.) or a non-compiled item (e.g., a code file, a text file) (step 708). If the selected item is determined to be a compiled item, then .NET reflection is used to determine one or more attributes (if any) defined for the item and property information for the portal entity is determined from the attributes (step 710). If the selected item is determined to be a non-compiled or text item, then text parsing techniques are used to determine the attributes defined for the item and property information is determined from the attributes (step 712). As part of steps 710 and 712, properties may be determined from the attributes. Information related to the properties may also be determined including values for the properties, sub-properties for the properties, and values assigned to the sub-properties.

If the processing is part of a deployment process or if portal entity definition information is to be configured, then the property information determined in steps 710 or 712 may be added to the portal entity definition information for the items being deployed (step 714). Examples of property information inserted in portal entity definition information are depicted in FIG. 6 and described above.

A determination is then made if all the items in the set of items determined in 704 have been processed (step 716). Accordingly, in step 716 a determination is made if any items exist in the set of items determined in 704 which have not been processed to determine attributes, if any, that are defined for the item. If it is determined that all the items in the set of items determined in 704 have not been processed, then the next unprocessed item is selected for processing (step 718) and processing continues with step 708. Processing ends if it is determined that all items in the set of items determined in 704 have been processed.

The processing depicted in FIG. 7 may be repeated for multiple portal entities. For example, for multiple portal entities corresponding to a set of items to be deployed, the processing depicted in FIG. 7 and described above may be used to find property information for the multiple portal entities. The property information determined for the portal entities may be stored as part of portal entity definition information for the items to be deployed. An archive may be formed including the portal entity definition information and the items and deployed to the target portal.

In the manner described above, property information for a portal entity may be specified for a portal entity by specifying or associating attributes with items on which the portal entity is based. Embodiments of the present invention automate the process of determining property information for a portal entity by determining attributes specified for items on which the portal entity is based and determining property information for the portal entity from the attributes. The property information determined for a portal entity may be used to generate portal entity definition information for a set of items to be deployed. By automating the determination of property information for the portal entities, the process of forming portal entity definition information is also simplified. This in turn simplifies the deployment process. The automation may be provided as part of the portal infrastructure.

Automating the process of determining property information allows changes to be made to the attributes specified for items and these changes are automatically reflected in the property information that is generated by processing the items. Further, since the attributes information for an item is stored as part of the item, and not in a separate file, it enhances the mobility of items from one project to another, e.g., an item may e moved from one project to another. Wizard may also be provided to help developers specify attributes for items.

Figure 8:
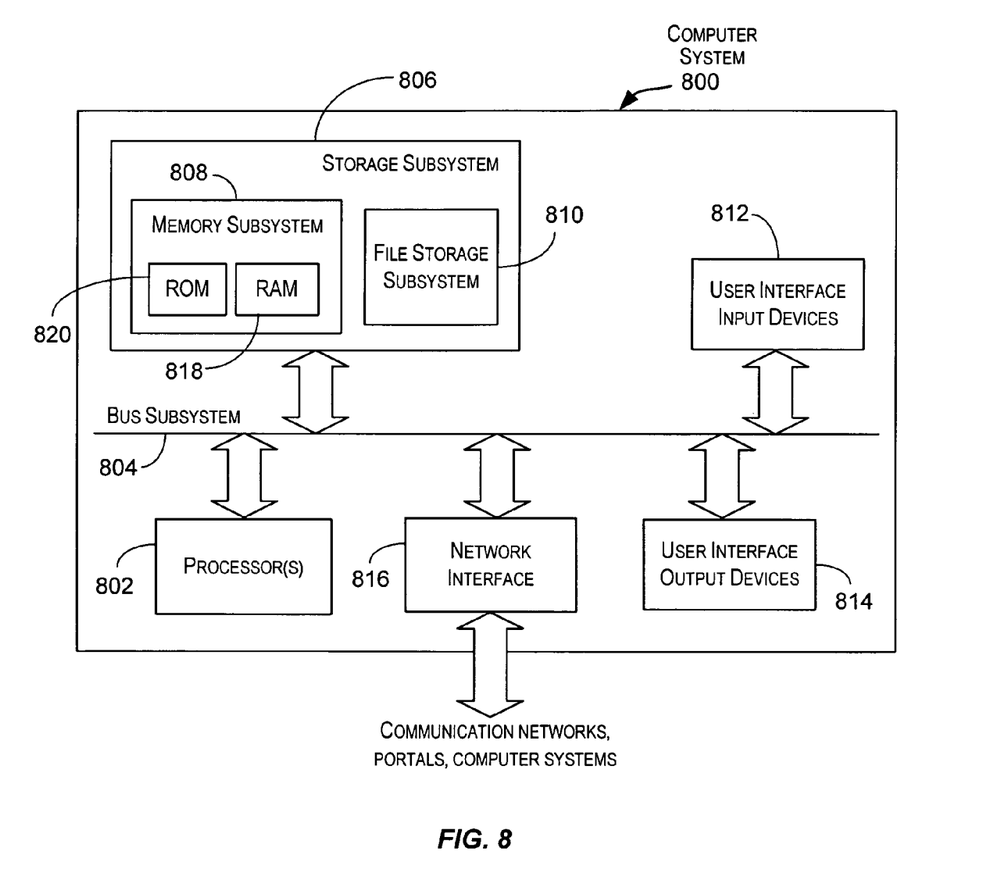
FIG. 8 is a simplified block diagram of a computer system that may be used to practice as embodiment of the present invention.

FIG. 8 is a simplified block diagram of a computer system 800 that may be used to practice as embodiment of the present invention. As shown in FIG. 8, computer system 800 includes a processor 802 that communicates with a number of peripheral devices via a bus subsystem 804. These peripheral devices may include a storage subsystem 806, comprising a memory subsystem 808 and a file storage subsystem 810, user interface input devices 812, user interface output devices 814, and a network interface subsystem 816.

Bus subsystem 804 provides a mechanism for letting the various subsystems of computer system 800 communicate with each other as intended. Although bus subsystem 804 is shown schematically as a single bus, alternative embodiments of the bus subsystem may utilize multiple busses.

Network interface subsystem 816 provides an interface to other computer systems including portals, and other networks. Network interface subsystem 816 serves as an interface for receiving data from other sources and for transmitting data to other sources from computer system 800. Embodiments of network interface subsystem 816 include an Ethernet card, a modem (telephone, satellite, cable, ISDN, etc.), (asynchronous) digital subscriber line (DSL) units, and the like.

User interface input devices 812 may include a keyboard, pointing devices such as a mouse, trackball, touchpad, or graphics tablet, a scanner, a barcode scanner, a touchscreen incorporated into the display, audio input devices such as voice recognition systems, microphones, and other types of input devices. In general, use of the term "input device" is intended to include all possible types of devices and mechanisms for inputting information to computer system 800.

User interface output devices 814 may include a display subsystem, a printer, a fax machine, or non-visual displays such as audio output devices, etc. The display subsystem may be a cathode ray tube (CRT), a flat-panel device such as a liquid crystal display (LCD), or a projection device. In general, use of the term "output device" is intended to include all possible types of devices and mechanisms for outputting information from computer system 800.

Storage subsystem 806 may be configured to store the basic programming and data constructs that provide the functionality of the present invention. Software code modules or instructions that provide the functionality of the present invention may also be stored in storage subsystem 806. These software modules may be executed by processor(s) 802. Storage subsystem 806 may also provide a repository for storing data used in accordance with the present invention. Storage subsystem 806 may comprise memory subsystem 808 and file/disk storage subsystem 810.

Memory subsystem 808 may include a number of memories including a main random access memory (RAM) 818 for storage of instructions and data during program execution and a read only memory (ROM) 820 in which fixed instructions are stored. File storage subsystem 810 provides persistent (non-volatile) storage for program and data files, and may include a hard disk drive, a floppy disk drive along with associated removable media, a Compact Disk Read Only Memory (CD-ROM) drive, an optical drive, removable media cartridges, and other like storage media.

Computer system 800 can be of various types including a personal computer, a portable computer, a workstation, a network computer, a mainframe, a kiosk, or any other data processing system. Due to the ever-changing nature of computers and networks, the description of computer system 800 depicted in FIG. 8 is intended only as a specific example for purposes of illustrating the preferred embodiment of the computer system. Many other configurations having more or fewer subsystems than the system depicted in FIG. 8 are possible.

Although specific embodiments of the invention have been described, various modifications, alterations, alternative constructions, and equivalents are also encompassed within the scope of the invention. The described invention is not restricted to operation within certain specific data processing environments, but is free to operate within a plurality of data processing environments. Additionally, although the present invention has been described using a particular series of transactions and steps, it should be apparent to those skilled in the art that the scope of the present invention is not limited to the described series of transactions and steps.

Further, while the present invention has been described using a particular combination of hardware and software, it should be recognized that other combinations of hardware and software are also within the scope of the present invention. The present invention may be implemented only in hardware, or only in software, or using combinations thereof. For example, the processing performed by the present invention, as described above, may be implemented in hardware chips, graphics boards or accelerators, etc.

The specification and drawings are, accordingly, to be regarded in an illustrative rather than a restrictive sense. It will, however, be evident that additions, subtractions, deletions, and other modifications and changes may be made thereunto without departing from the broader spirit and scope of the invention as set forth in the claims.

What is claimed is:

1. A method performed by a computer system for determining portal property information for a portal entity, the method comprising:
   determining a set of a plurality of portal items on which the portal entity is based;
   for at least one compiled portal item in the plurality of portal items, automatically performing the following:
      determining, using .NET reflection, a first set of portal attributes specified for the at least one compiled portal item, and
      determining first portal property information for the portal entity from the determined first set of portal attributes;
   for at least one non-compiled portal item in the plurality of portal items, automatically performing the following:
      determining, using a text parser, a second set of portal attributes specified for the at least one non-compiled portal item, and
      determining second portal property information for the portal entity from the determined second set of portal attributes; and
   providing both the first portal property information and the second portal property information to a portal, wherein the first and portal property information are used by the portal for execution of the portal entity so as to control operation of a portal user interface of the portal entity.

2. The method of claim 1 further comprising:
specifying a first portal attribute for a first portal item from the set of portal items, the first portal attribute defining a portal property and information related to the portal property.

3. The method of claim 1 wherein the determined first set of portal attributes comprises a first portal attribute specified for a first compiled portal item, the first portal attribute identifying a portal property and information related to the portal property.

4. The method of claim 3 where the first portal attribute is a .NET attribute.

5. The method of claim 1 wherein
determining the first portal property information comprises:
determining a portal property from the determined first set of portal attributes;
determining a portal value for the portal property from the determined first set of portal attributes;
determining a portal sub-property of the portal property from the determined first set of portal attributes; and
determining a portal value for the portal sub-property from the determined first set of portal attributes.

6. A method performed by a computer system for deploying portal items to a portal, the method comprising:
receiving information identifying a plurality of portal items to be deployed to a portal;
determining a set of one or more portal entities;
determining portal property information for each portal entity in the set of portal entities based upon both (i) a first set of portal attributes specified for one or more compiled portal items from the plurality of portal items, wherein the portal property information determined based upon the first set of portal attributes is determined using .NET reflection, and (ii) a second set of portal attributes specified for one or more non-compiled portal items from the plurality of items portal, wherein the portal property information determined based upon the second set of portal attributes is determined using a text parser;
creating portal archive comprising the plurality of portal items and the portal property information determined for each portal entity in the set of portal entities; and
deploying the portal archive to the portal, wherein the portal property information for a portal entity is used by the portal during execution of the portal entity so as to control operation of a portal user interface of the portal entity.

7. A data processing system for determining portal property information for a portal entity, the data processing system comprising:
a processor;
a memory, the memory storing a plurality of instructions for execution by the processor, the plurality of instructions comprising instructions which when executed by the processor cause the processor to:
determine a set of a plurality of portal items on which the portal entity is based;
for at least one compiled portal item in the set of a plurality of portal items, automatically perform the following:
determine, using .NET reflection, a first set of portal attributes specified for the at least one compiled portal item, and
determine first portal property information for the portal entity from the determined first set of portal attributes;
for at least one non-compiled portal item in the set of a plurality of portal items, automatically perform the following:
determine, using a text parsing technique, a second set of portal attributes specified for the at least one non-compiled portal item, and
determine second portal property information for the portal entity from the determined second set of portal attributes; and
provide both the first portal property information and the second portal property information to a portal, wherein the first and second portal property information are used by the portal for execution of the portal entity so as to control operation of a portal user interface of the portal entity.

8. The data processing system of claim 7 wherein the plurality of instructions comprises instructions which when executed by the processor cause the processor to:
enable specification of a first portal attribute for a first portal item from the set of portal items, the first portal attribute defining a portal property and portal information related to the portal property.

9. The data processing system of claim 7 wherein the first set of portal attributes comprises a first portal attribute specified for a first compiled portal item, the first portal attribute identifying a portal property and portal information related to the portal property.

10. The data processing system of claim 9 wherein the first portal attribute is a .NET attribute.

11. The data processing system of claim 7 wherein
the instructions that cause the processor to determine the first portal property information comprise instructions that cause the processor to:
determine a portal property from the determined first set of portal attributes;
determine a portal value for the portal property from the determined first set of portal attributes;
determine a portal sub-property of the portal property from the determined first set of portal attributes; and
determine a portal value for the portal sub-property from the determined first set of portal attributes.

12. A system for deploying portal items to a portal, the system comprising:
a portal; and
a data processing system coupled to the portal, wherein the data processing system comprises:
a processor, and
a computer-readable storage medium, the medium storing a plurality of instructions for execution by the processor, the plurality of instructions comprising instructions which when executed by the processor cause the processor to:
receive information identifying a plurality of portal items to be deployed to a portal;
determine a set of one or more portal entities;
determine portal property information for each portal entity in the set of portal entities based upon both (i) a first set of portal attributes specified for one or more compiled portal items from the plurality of portal items, wherein the portal property information determined based upon the first set of portal attributes is determined using .NET reflection, and (ii) a second set of portal attributes specified for one or more non-compiled portal items from the plurality of portal items, wherein the portal property information determined based upon the second set of portal attributes is determined using a text parser;

create a compressed portal archive comprising the plurality of portal items and the portal property information determined for each portal entity in the set of portal entities; and deploy the compressed portal archive to the portal, wherein the portal property information for a portal entity is used by the portal during execution of the portal entity so as to control operation of a portal user interface of the portal entity.

13. The system of claim 12, wherein the portal property information comprises portal security settings information.

14. The system of claim 13, wherein the portal property information comprises portal personalization information.

15. The system of claim 14, wherein at least one of the portal entities comprises a portal user interface component.

16. The system of claim 15, wherein at least one of the portal entities comprises a portal snippet configured to display information to a portal user.

* * * * *